Figures 1, 2:
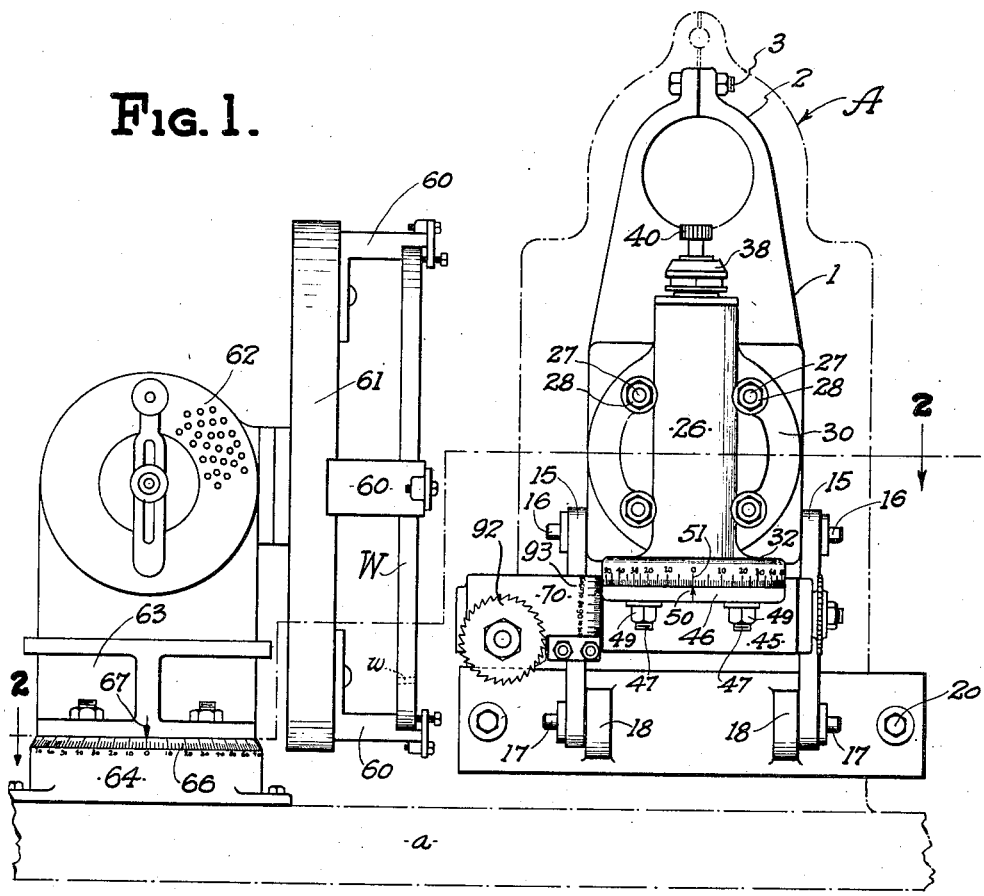

Dec. 12, 1939.  V. PALUMBO  2,183,166
ATTACHMENT FOR MILLING OR OTHER MACHINES
Filed July 18, 1938   2 Sheets-Sheet 1

INVENTOR.
Vincent Palumbo
BY Hull, Brock & West
ATTORNEYS.

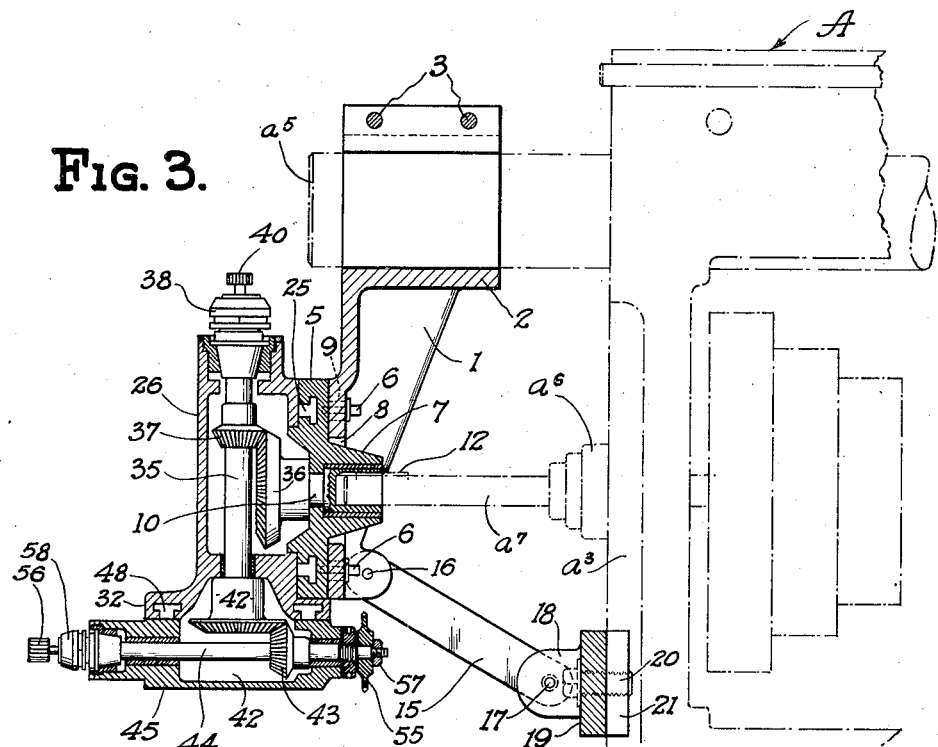
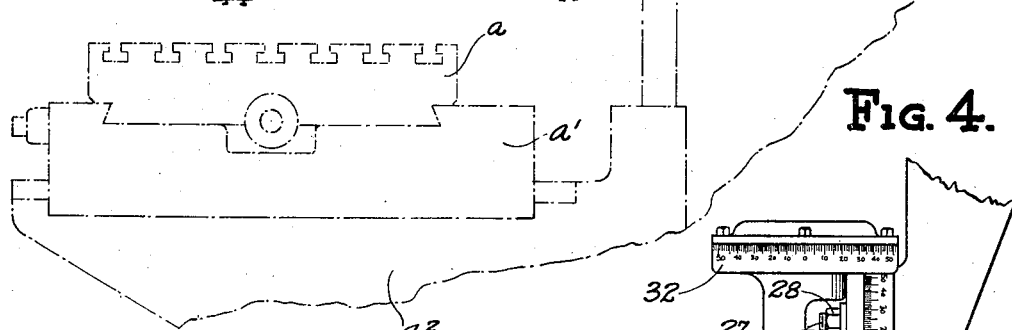
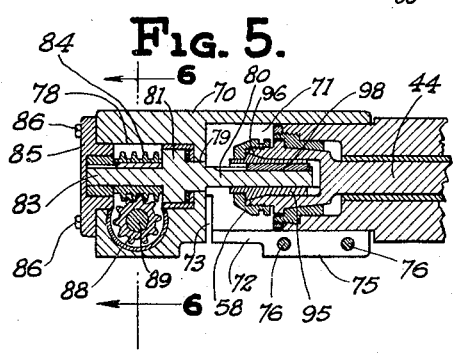
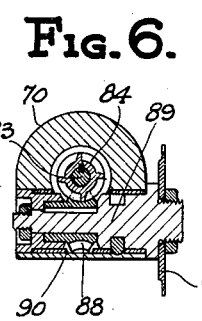

Patented Dec. 12, 1939

2,183,166

UNITED STATES PATENT OFFICE 2,183,166

ATTACHMENT FOR MILLING OR OTHER MACHINES

Vincent Palumbo, Cleveland, Ohio

Application July 18, 1938, Serial No. 219,677

7 Claims. (Cl. 90—17)

This invention relates to machine attachments, and its principal purpose is to provide a compact, relatively inexpensive and simple mechanism that is comparatively light of weight and, accordingly convenient of handling, and which may, with facility, be attached to, and placed in driving connection with the spindle of, a plain milling machine or other apparatus of similar character and simplicity and by virtue of which mechanism practically all varieties of work that ordinarily require the use of a complicated and expensive universal milling machine may be equally well performed on a much cheaper machine or apparatus of the aforesaid character.

Another object of the invention is to provide an attachment of the foregoing nature that may be simultaneously equipped with a plurality of different kinds of tools or cutters so that a variety of operations may be performed without the trouble or delay occasioned by the changing of tools, this being especially advantageous where a series of operations of different character has to be repeated on a succession of like pieces of work.

A more specific object is to provide an attachment for plain milling machines or the like that is made up of a plurality of separably connected units, as, for example, a vertical spindle unit that may be used independently of the others with the others attached to or detached from it; a so-called horizontal milling unit which, when it is to be used and, therefore, made a part of the assembly, receives its power from the vertical spindle, and a cross-spindle unit that may be attached to the horizontal milling unit and driven thereby.

Another object is to combine with mechanism of the foregoing character, a swivel work holder for mounting upon the working bed of the machine and adjustable with respect thereto so that cuts of any desired angle to the axis of the work may be executed.

A further object is to provide between adjacent units of the beforementioned assembly a very wide range of adjustment, desirably 360°, the relatively adjustable parts of the assembly being desirably indexed to facilitate the making of adjustments and promote accuracy thereof.

The foregoing objects and advantages, with others hereinafter appearing, are attained in the embodiment of the invention illustrated in the accompanying drawings that form a part hereof and wherein like reference characters designate corresponding parts throughout the several views.

In the drawings, Fig. 1 is a front elevation of my improved attachment, the parts of a plain milling machine to which it is connected being shown in dotted lines; Fig. 2 is a sectional plan substantially on the line 2—2 of Fig. 1; Fig. 3 is a central vertical section at right angles to the plane of Fig. 1, showing the horizontal tool spindle adjusted to a position 90° from that illustrated in Figs. 1 and 2, the view including the adjacent parts of the milling machine in dotted lines; Fig. 4 is a fragmentary side elevation of the attachment with the vertical tool spindle inverted with respect to the position it occupies in the previous views and with the so-called horizontal milling attachment removed and a cover applied in place thereof; and Figs. 5 and 6 are longitudinal and transverse sections, respectively, through the cross-spindle unit, the plane of section of the latter view being indicated by the line 6—6 of Fig. 5.

Although the invention, by suitable obvious changes in the mode of attachment, may be used in connection with machines of other types, I have disclosed it herein associated with a plane milling machine, parts of which are indicated in dotted lines in several of the views. The milling machine is designated, generally, by the reference letter A. In accordance with the usual practice, the working table $a$ is mounted for adjustment, through the intervention of the saddle $a'$, on the knee $a^2$ which, in turn, is slidable on the face $a^3$ of the standard of the machine. Projecting forwardly from the top portion of the standard is the overhanging arm $a^5$ which, as will be readily understood, is longitudinally adjustable within the standard. The spindle of the machine is designated $a^6$, and clamped in the forward end of the spindle in axial alignment therewith is the arbor $a^7$.

1 represents the mounting or bracket of the attachment of my invention, and its split, hub-like upper end 2 is engaged over and is adapted to be clamped by bolts 3 to the overhanging arm $a^5$ of the milling machine. A circular fitting 5 is fastened by means of screws 6 to the front face of the lower end of the mounting 1 with a rearwardly extending boss 7 of such fitting projecting through an opening 8 in the mounting. Adjustment between these parts is provided by enlarged openings or slots 9 in the mounting through which the screws 6 pass, the purpose of which will presently appear.

Mounted within a central bore of the fitting 5 is a shaft 10 whose enlarged rear end is journalled in a bushed enlargement of the bore and is provided with an axial socket for the reception of the forward end of the arbor $a^7$, the shaft and arbor being held against turning with respect to each other, as by a key 12. This type of connection permits axial movement between the attachment and the arbor of the milling machine when the overhanging arm $a^5$ is shifted longitudinally within the standard of the machine, or when the mounting 1 is adjusted longitudinally of the overhanging arm; and the previously mentioned adjustment between the mounting 1 and fitting 5 permits the shaft 10 to be accurately aligned with the arbor $a^7$.

In order to hold the lower end of the mounting 1 rigid so that work of the highest precision may be accomplished by means of the attachment and at the same time allow for the adjustments above referred to, I provide links 15 whose forward ends are journalled on pins 16 that extend laterally from the lower end of the mounting and whose rear ends are similarly mounted on pins 17 that project laterally from lugs 18 on a member 19 that is adapted to be clamped in any adjusted position by means of screws 20 and shoes 21 to the face $a^3$ of the standard of the milling machine.

The fitting 5 is provided with an annular T-slot 25 that opens through the front of the fitting in concentric relation to the shaft 10, and swiveled to the front of the fitting is a housing 26 that is adapted to be secured in any position of adjustment with respect to the fitting by bolts 27 whose heads are confined within the T-slot 25 and to whose outer ends are applied nuts 28. The main portion of the housing 26 is cylindrical. At one side it is provided with a circular base 30, whose periphery is coincident with that of the circular fitting 5, and at one end the housing is formed with a circular enlargement 32. Journalled within the housing 26 is a tool spindle 35, whose axis bisects that of the shaft 10. A bevel gear 36, fastened to the outer end of the shaft 10, meshes with a beveled pinion 37 on the spindle 35, the relative sizes of the gear and pinion causing the speed of the spindle to be considerably increased over that of the shaft. One end of the spindle is equipped with a suitable tool attaching means 38, which may be a chuck of usual type, and clamped therein is the shank of a tool 40. Fastened to the opposite end of the spindle 35 is a beveled gear 42 that meshes with a beveled pinion 43 on a spindle 44 that is journaled in a housing 45. This housing, with the spindle 44 and other directly associated parts, constitutes the portion of the attachment hereinbefore referred to as the horizontal milling unit. The major portion of the housing 45 is cylindrical and it incorporates at one side a circular base 46 that is swiveled to the enlarged end 32 of the previously mentioned housing 26, the connection being made through bolts 47 whose heads interlock in an annular T-slot 48 that opens through the end of the enlargement 32 in concentric relation to the axis of the spindle 35. The housing 45 is adapted to be clamped in any angular position of adjustment with respect to the housing 26 by nuts 49 that are applied to the bolts 47. To facilitate the attainment of the desired angular relation between the housings, an index 50 is provided on the periphery of the base 46 for cooperation with a scale 51 on the coincident peripheral surface of the enlargement 32. For a similar purpose, the periphery of the base 30 of the housing 26 is provided with an index 52 that cooperates with a scale 53 on the cylindrical face of the fitting 5. Tools 55 and 56 of any appropriate character may be attached, by suitable connecting means 57 and 58, respectively, to the opposite ends of the spindle 44, for operation on work clamped in the usual manner to the table $a$ of the milling machine.

It will be readily apparent to one skilled in the art that the tools designated 40, 55 and 56, selected for illustrative purposes only, may be replaced by numerous other kinds of tools, depending upon the character of the work to be performed.

In Figs. 1 and 2 I have indicated a piece of work of a sort requiring the use of the third unit of the assembly—the cross-spindle unit—that is shown in detail in Figs. 5 and 6. The particular piece of work selected for illustrative purposes in this connection is designated W and consists of a ring of rectangular cross section, as indicated in Fig. 2, and the inner periphery of which is to be milled in such manner as to provide axial ribs or teeth $w$, having inclined faces $w'$. The work is secured, through the usual clamping means 60, to a face plate 61 that is rotatably carried by an indexing head 62 of a common and well known character. The latter surmounts a support 63 that is swiveled to an annular base 64 and secured to the working table $a$ of the milling machine. The connection between the support 63 and the base 64 is similar to those previously described between the housings 45 and 26, and between the latter housing and the fitting 5. The upper edge of the base is provided with graduations 66 wherewith cooperates an index 67 on the support 63.

Turning now to a description of the cross-spindle unit, the same comprises a generally cylindrical body 70 provided at one end with a relatively deep cylindrical socket 71. The socketed end portion of the body is split along one side from its terminal to a segmental kerf 73, the purpose of which is to render such end portion yieldable in the nature of a split sleeve. Along the separated longitudinal edges of the split portion are flanges 75 having aligned apertures through which clamping bolts 76 are engaged for contracting said portion of the body.

Opening through the end of the body opposite the socket 71 is a cylindrical recess 78 that communicates with said socket through a bore 79. The reduced inner end 80 of an arbor 81 extends through the bore 79 and is provided with a keyway, as shown in Fig. 5. Keyed or otherwise fastened to the forwardly extending reduced end 83 of the arbor, within the recess 78, is an angle gear 84, beyond which the end of the extension 83 is journaled within a bushed recess of a cap 85 held to the end of the body 70 by screws 86, and including a cylindrical extension that fits into the outer end of the recess 78. Meshing with the angle gear 84 is a similar gear 88 on a cross spindle 89 that, through suitable bearings, is rotatably supported within a transverse bore 90 of the body 70. To one end of the cross spindle 89 is suitably fastened a milling cutter or saw 92 by means of which the work W is slotted to produce the teeth $w$.

The means 58 by which the tool 56 is attached to the spindle 44 involves a collet of usual form within which the shank of the tool is clamped, the collet being forced into a tapered axial socket of the shaft by the hollow nut or means to which the numeral 58 is applied. In preparing the attachment for the application of the cross-spindle unit, a sleeve 95, having a tapered portion 96 (Fig. 5) is substituted for the collet and is forced into the end of the spindle 44 by the hollow nut or means 58. The sleeve 95 carries a key 98. The horizontal milling unit being thus prepared for the attachment of the cross-spindle unit, the socketed end of the body 70 of the latter unit is applied to the cylindrical end of the housing 45 and is clamped thereto in the desired position of longitudinal or angular adjustment by the bolts 76, the inner end 80 of the arbor 81 being inserted within the sleeve 95 with its keyway in a position to receive the key 98. The adjustment between the units is facilitated by a scale 93 on the inner end of the body 70 that may be read in conjunction with any selected graduation on the periphery of the enlargement 32 of the housing 26, such selected graduation serving as an index. For performing the particular piece of work herein disclosed, the cross-spindle unit is adjusted so as to dispose the milling cutter or saw 92 in a vertical plane.

In performing the operation now under consideration, the parts are first adjusted as illustrated in Fig. 1 with the work W disposed in a plane perpendicular to and transversely of the working bed $a$. With the attachment adjusted as illustrated in Figs. 1 and 2, and with the work disposed in the position stated (see Fig. 1), and with the machine in operation, the table $a$ is moved to present the work to the milling cutter or saw 92 in a vertical plane coincident with the axis of the work. It will be understood that, to dispose the parts in this relation, the table $a$ is shifted forwardly from the position it occupies in Fig. 2 so that the vertical axis of the swivel connection between the support 63 and base 64 will be in the vertical plane of the milling cutter 92.

During the operation thus far described, the table will be reciprocated in order to produce the slots that separate the teeth $w$, and between reciprocations the face plate 61 that supports the work W will be rotated a distance corresponding to the spacing of the teeth through means of the indexing head 62. After this operation of slotting the work has been completed, the support 63 is adjusted on the base 64 and the table $a$ is fed inwardly to effect the adjustment of the parts illustrated in Fig. 2; and now, by alternately reciprocating the table and indexing the work, the teeth $w$ may be milled to produce the inclined faces $w'$.

Having thus described my invention, what I claim is:

1. An attachment for standard milling machines or the like comprising a support connectible to a part of the machine, a shaft journaled therein and adapted to have driving connection with the spindle of the machine, a housing swiveled to the support on the axis of said shaft, a tool spindle journaled in the housing transverse said axis, constantly meshing driving connections between the shaft and tool spindle, means for attaching a tool to one end of the tool spindle, a second housing swiveled to the first mentioned housing on the axis of said tool spindle, a spindle journaled in the second mentioned housing, constantly meshing driving connections between the two spindles, and means for attaching tools to the opposite ends of the second mentioned spindle.

2. An attachment for standard milling machines or the like comprising a mounting connectible to a part of the machine, a fitting adjustably carried by the mounting, a shaft journaled therein and adapted to have driving connection with the spindle of the machine, a housing swiveled to the fitting on the axis of said shaft, a tool spindle journaled in the housing transverse said axis, constantly meshing driving connections between the shaft and tool spindle, and means for attaching a tool to one end of the tool spindle.

3. An attachment for plain milling machines comprising a mounting adapted to be clamped to the overhanging arm of the machine, a fitting, a shaft journaled in said fitting, means connecting the fitting to the mounting with said shaft in axial alignment with the spindle of the machine, driving connections between the shaft and spindle of a nature permitting axial adjustment of the shaft with respect to the spindle, a housing swiveled to the fitting on the axis of the shaft, a tool spindle journaled in the housing transverse said axis, constantly effective driving connections between the shaft and spindle, means for attaching a tool to one end of the spindle, a driving member fastened to the opposite end of the spindle, a second housing swiveled to the first mentioned housing on the axis of said tool spindle, a spindle journaled in the second mentioned housing transverse the axis of the former tool spindle, a driving member on the second mentioned spindle meshing with the former driving member, and means for attaching tools to the opposite end of the second mentioned spindle.

4. An attachment for plain milling machines comprising a mounting adapted to be clamped to the overhanging arm of the machine, a fitting, a shaft journaled in said fitting, means connecting the fitting to the mounting with said shaft in axial alignment with the spindle of the machine, driving connections between the shaft and spindle of a nature permitting axial adjustment of the shaft with respect to the spindle, a housing swiveled to the fitting on the axis of the shaft, a tool spindle journaled in the housing transverse said axis, constantly effective driving connections between the shaft and spindle, means for attaching a tool to one end of the spindle, a driving member fastened to the opposite end of the spindle, a second housing swiveled to the first mentioned housing on the axis of said tool spindle, a second tool spindle journaled in the second mentioned housing transverse the axis of the former tool spindle and having provisions for the attachment of tools thereto, a driving member on the second tool spindle meshing with the former driving member, a body adapted to be rotatably mounted on a part of the second mentioned housing about one end of the spindle journaled therein, an arbor journaled in the body in axial alignment with the second tool spindle and having driving connection therewith, and a cross spindle journaled in said body and having driving connection with said arbor, the cross spindle having provisions for the attachment of a tool thereto.

5. An attachment for standard milling machines or the like comprising a bracket formed at its upper end to provide a split sleeve for clamping engagement with the overhanging arm of the machine, the lower end of said bracket having an opening whose axis is substantially parallel to that of said sleeve, a fitting applied to the front face of the bracket about said opening and provided with a boss smaller in diameter than said opening and projecting therethrough, means adjustably connecting the fitting to the bracket, the fitting having a bore axial of said boss, a shaft journaled in said bore and adapted to have direct driving connection with the spindle of the machine, the fitting including an annular forwardly projecting flange in concentric relation to the bore, a substantially cylindrical housing provided with a base at one side formed with an aperture for the reception of said flange whereby the housing is swiveled to the fitting, means for locking the housing to the fitting in various positions of angular adjustment, a spindle journaled within the housing longitudinally thereof with its axis bisecting that of the aforesaid shaft, constantly meshing driving connections between the shaft and spindle, and means for attaching a tool to one end of the spindle.

6. In combination, a mounting adapted to be clamped to a part of a milling machine or the like, a shaft rotatably supported upon the mounting and adapted to have driving connection with the spindle of the machine, a housing swiveled with respect to the mounting on the axis of the said shaft, a tool spindle journaled in the housing transverse said axis and having provision for attaching a tool thereto, constantly effective driving connections between the shaft and spindle, a second housing swiveled to the first mentioned housing on the axis of said tool spindle, a second tool spindle journaled in the second mentioned housing having provision for attaching tools thereto, constantly effective driving connections between the two tool spindles, a body adapted to be rotatably mounted on a part of the second mentioned housing about one end of the second tool spindle, a cross-spindle journaled in said body, constantly effective driving connections between the cross-spindle and the second spindle, and means for attaching a rotary cutter on one end of the cross-spindle.

7. An attachment for milling machines or the like including a housing having a cylindrical end portion, a spindle journaled within the housing with an end thereof exposed centrally of said cylindrical end, a body having a cylindrical socket opening through one end thereof for application to the cylindrical end of the housing, the body being split along one side of the socket so as to render the socketed end of the body yieldable, means for contracting said end of the body about the housing so as to clamp the body to the housing in various positions of adjustment, an arbor journaled within the body in axial alignment with the spindle, there being an axially adjustable driving connection between the spindle and arbor, a cross-spindle journaled in the body, driving connections between the arbor and cross-spindle, and means for attaching a tool to one end of the cross-spindle.

VINCENT PALUMBO.